United States Patent
Ogura et al.

(10) Patent No.: US 6,712,707 B2
(45) Date of Patent: Mar. 30, 2004

(54) BEARING DEVICE FOR DRIVING WHEEL

(75) Inventors: Hiroyuki Ogura, Shizuoka-ken (JP);
Akira Torii, Shizuoka-ken (JP);
Takayasu Takubo, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/973,065

(22) Filed: Oct. 10, 2001

(65) Prior Publication Data
US 2002/0049091 A1 Apr. 25, 2002

(30) Foreign Application Priority Data
Oct. 10, 2000 (JP) ........................................ 2000-309538
Oct. 10, 2000 (JP) ........................................ 2000-309543

(51) Int. Cl.$^7$ ............................................. F16C 13/04
(52) U.S. Cl. ...................... 464/178; 464/906; 384/589
(58) Field of Search ................................ 464/178, 906; 301/105.1; 384/589

(56) References Cited
U.S. PATENT DOCUMENTS 3,986,754 A * 10/1976 Torrant
4,887,917 A * 12/1989 Troster et al. ........... 464/178 X
6,135,571 A * 10/2000 Mizukoshi et al. ...... 464/178 X
6,280,093 B1 * 8/2001 Ohtsuki et al. .......... 384/589 X
6,485,188 B1 * 11/2002 Dougherty ........... 301/105.1 X
2002/0064327 A1 * 5/2002 Toda et al. ................. 384/589
2002/0072421 A1 * 6/2002 Ouchi .......................... 464/178

* cited by examiner

Primary Examiner—Greg Binda
(74) Attorney, Agent, or Firm—Arent Fox Kintner Plotkin & Kahn, PLLC

(57) ABSTRACT

A driving wheel bearing device has an outer member on an inner peripheral surface forming double row raceways, an inner member on an outer peripheral surface of which raceways opposing to raceways of the outer member and a wheel mounting flange are formed, double row rolling elements between each raceway of the outer and inner members, and a constant velocity universal joint having a joint outer ring of which a shaft portion is inserted into the inner member such that torque is transmittable, the bearing device rotatably supporting a wheel on an automobile body, wherein a pilot portion is provided between a base part of the shaft portion of the joint outer ring and an end portion of the inner member.

10 Claims, 5 Drawing Sheets

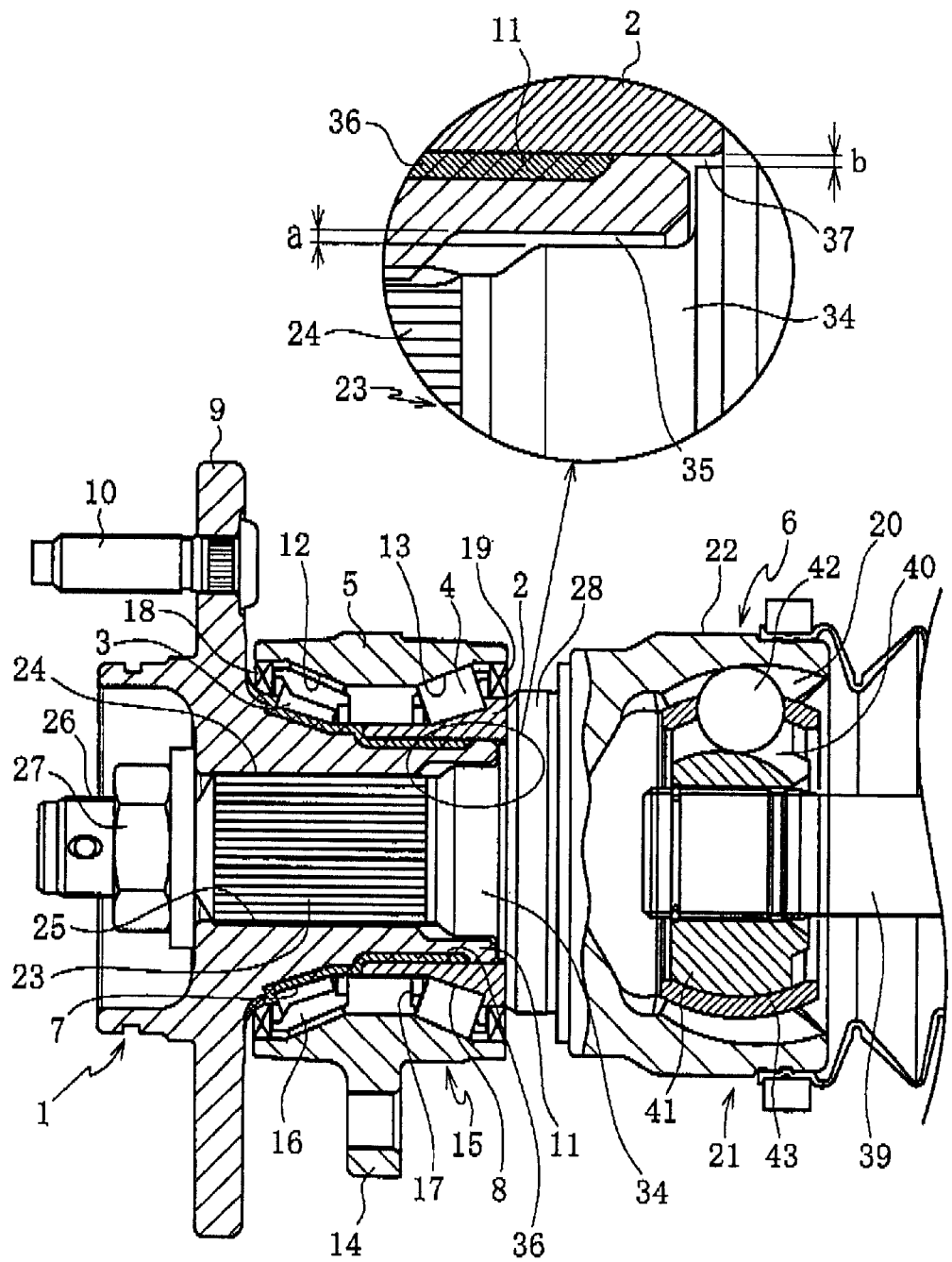

BEARING DEVICE FOR DRIVING WHEEL

BACKGROUND OF THE INVENTION

1. Field of the Invention

The present invention relates to a bearing device for a driving wheel for rotatably supporting a driving wheel of an automobile on an automobile body.

2. Description of the Related Art

Different types of bearing devices for driving wheels of automobiles have been proposed depending on use. For example, a bearing device shown in FIG. 4 has as major structural elements a hub ring 101, an inner ring 102, rolling elements 103 and 104 of double rows, an outer ring 105, and a constant velocity universal joint 106.

The hub ring 101 is formed with an outboard raceway 107 on its outer peripheral surface and provided with a wheel-mounting flange 109 for mounting a wheel. Hub bolts 110 for fixing a wheel disk are provided on a wheel-mounting flange 109 at equal intervals in a circumferential direction. The inner ring 102 is fitted onto a small-diameter stepped portion 111 formed on an outer peripheral surface of an inboard-side end portion of the hub ring 101, and an inboard raceway 108 is formed on an outer peripheral surface of the inner ring 102.

The inner ring 102 is pressed into position with an appropriate interference in order to prevent its creeping. Raceways of double rows are constituted by the outboard raceway 107 formed on the outer peripheral surface of the hub ring 101 and by the inboard raceway 108 formed on the outer peripheral surface of the inner ring 102. The inner ring 102 is pressed onto the small-diameter stepped portion 111 of the hub ring 101, and a joint outer ring 121 is inserted into the hub ring 101 from its inboard side in an axial direction. Then, the joint outer ring 121 is fastened with the hub ring 101. With this process, an end portion of the inner ring 102 is butted against a shoulder portion 128 of the joint outer ring 121, so that the inner ring 102 is prevented from loosening and preload to a bearing portion 115 is controlled.

On an inner peripheral surface of the outer ring 105, raceways 112 and 113 of double rows are formed, which oppose to the raceways 107 and 108 of the hub ring 101 and the inner ring 102, and the outer ring 105 is provided with an automobile-body-mounting flange 114 for mounting a bearing device on automobile body. The flange 114 is fixed with bolts to a knuckle extending from a suspension device of the automobile body.

The bearing portion 115 is of a double-row angular ball bearing structure in which the rolling elements 103 and 104 are provided between a group of the raceways 107 and 108 formed on outer peripheral surfaces of the hub ring 101 and the inner ring 102 and a group of raceways 112 and 113 formed on an inner peripheral surface of the outer ring 105, and the rolling elements 103 and 104 in each row are supported by cages 116 and 117 at equal intervals in a circumferential direction.

At opening portions of both ends of the bearing portion 115, a pair of seals 118 and 119 sealing an annular space formed by the outer ring 115, the hub ring 101 and the inner ring 102 is fitted into an inside of the hole at an end portion of the outer ring 105 so as to prevent leakage of grease filled inside and ingress of water or foreign matters from outside.

The constant velocity universal joint 106 comprises the joint outer ring 121 provided at one end of the shaft 139 and formed with the track groove 120 on its inner peripheral surface, a joint inner ring 141 on an outer peripheral surface of which a track groove 140 opposing to the track groove 120 of the joint outer ring 121 is formed, balls 142 installed between the track groove 120 of the joint outer ring 121 and the track groove 140 of the joint inner ring 141, and a cage 143 provided between the joint outer ring 121 and the joint inner ring 141 for supporting the balls 142.

The joint outer ring 121 has a mouth portion 122 accommodating the joint inner ring 141, the balls 142 and the cage 143, and a shaft portion 123, extending in an axial direction from the mouth portion 122 and being formed with a serrated portion 124 on its outer peripheral surface. The shaft portion 123 is inserted into a through-hole of the hub ring 101 so that they are fitted together through serrated portions 124 and 125 formed on the outer peripheral surface of the shaft portion 123 and an inner peripheral surface of the through-hole, respectively. Then, the constant velocity universal joint 106 is fixed to the hub ring 101 by tightening a nut 127 on an external thread portion 126 formed on an end of the shaft portion 123. Preload of the bearing portion 115 is controlled by axial forced applied by tightening the nut 127.

In the bearing device in FIG. 4, preload of the bearing portion 115 is controlled by tightening torque of the nut 127, while in the bearing device shown in FIG. 5 in which a swaging process is employed in assembling it, preload control by fastening torque of the nut 127 is not required.

In this bearing device, a projection end portion of the small-diameter stepped portion 111 of the hub ring 101 is swaged by plastically deforming it toward an outside-diameter side, and the hub ring 101 and the inner ring 102 are unitized together by the swaged portion, or a swaged portion 131, by which the inner ring 102 is prevented from loosening and preload of the bearing portion 115 is controlled. Therefore, when engaging a bolt 133 into a threaded hole 132 formed on the shaft portion 123 of the joint outer ring 121 after inserting the shaft portion 123 through the though-hole of the hub ring 101, the joint outer ring 121 is fixed to the hub ring 101 with tightening torque that is necessary and sufficient to prevent the joint outer ring 121 from loosening.

On the other hand, in a bearing device using balls as the rolling elements 103 and 104, because the contact angle is set to about 35°, loads acting on the inner ring 102 in a direction of forming a contact angle are also taken at the swaged portion 131 of the hub ring 101 butted against the shoulder portion 128 of the joint outer ring 121. Here, the term "contact angle" means the angle measured between the lines of action of force transmitted to the rolling elements 103 and 104 by the raceways 107 and 108, and a plane (or a radial plane) perpendicular to the axis of a bearing.

Accordingly, the small-diameter stepped portion 111 of the hub ring 101 and the raceway 108 of the inner ring 102 tend to be deformed by loads acting in a direction of forming a contact angle. With increasing amount of deformation of the small-diameter stepped portion 111 of the hub ring 101, the possibility of breakage of the hub ring 101 and fretting between the hub ring 101 and the inner ring 102 increases. Further, an increased amount of deformation of the raceway 108 of the inner ring 102 tends to cause deterioration of rolling service life, rise in temperature on the raceway 108, and loss in axial force (or preload) caused by fretting between the inner ring 102 and the shoulder portion 128 of the joint outer ring 121. When the small-diameter stepped portion 111 of the hub ring 101 and the raceway 108 of the inner ring 102 become to tend to undergo deformation as described above, strain produced inside the bearing may cause deterioration of service life of the bearing device.

SUMMARY OF THE INVENTION

An object of the invention is to improve the service life of a bearing device by preventing strain from being generated inside the bearing device, in which the strain is caused by deformation of a hub ring and an inner ring by loads acting in a direction of forming a contact angle.

A bearing device for a driving wheel of the invention includes an outer member on an inner peripheral surface of which raceways of double rows are formed, an inner member on an outer peripheral surface of which raceways opposing to the raceways of the outer member and a wheel mounting flange are formed, rolling elements of double rows installed between each of the raceways of the outer member and the inner member, and a constant velocity universal joint having a joint outer ring of which a shaft portion is fitted into the inner member in a manner that torque is transmittable. The bearing device rotatably supports a wheel on an automobile body. In this construction, a pilot portion is provided between a base part of the shaft portion of the joint outer ring and an end portion of the inner member. A clearance of the pilot portion is preferably 0.4 mm or less.

By providing the pilot portion between the base part of the joint outer ring and the inner member as described above, loads acting in a direction of forming a contact angle prevents deformation of the end portion of the inner member, so that breakage of the inner member is prevented and fretting of the inner member is reduced. Thus, service life of a bearing device is improved, allowing providing a highly reliable bearing device having long service life.

The invention is applicable to a bearing device having an outer member integrally provided with raceways of double rows on its inner peripheral surface and a wheel mounting flange on its outer peripheral surface. Further, the invention is also applicable to a bearing device having an inner member comprising a hub ring on an outer peripheral surface of which a wheel mounting flange, one of the raceways, and a small-diameter stepped portion are formed, and an inner ring, which is a separate member, fitted to the small-diameter stepped portion and on an outer peripheral surface of which the other raceway is formed.

In the structure described above, the pilot portion is positioned on a line extending from the line of forming a contact angle for the rolling elements on the raceway of the inner member. When the pilot portion is provided, loads acting in a direction of forming a contact angle securely prevents deformation of the end portion of the inner member, thereby facilitating further improvement of service life of the bearing device.

In the structure described above, serrated portions formed on both the inner member and the shaft portion of the joint outer ring in such a manner that torque is transmittable are preferably fitted together with an interference. By doing so, the inner member and the shaft portion of the joint outer ring can be fitted together without play.

It is also preferable that a surface hardened layer is formed in an area extending from a base portion of the wheel-mounting flange to an end portion of the inner member. By doing so, rolling fatigue life is increased and fretting can be reduced by increased surface hardness of an area including the raceway of the inner member.

The present invention is characterized in that the inner member has a swaged portion in which an end portion of the inner member is plastically deformed toward its outside-diameter side, and the swaged portion is butted against a shoulder portion of the joint outer ring in a linear contact. By making the swaged portion of the inner member and the shoulder portion of the joint outer ring butt against each other in linear contact, noise from between the swaged portion of the inner member and the shoulder portion of the joint outer ring can be prevented from occurring.

The bearing device according to the invention is further characterized in that the inner member and the shaft portion of the joint outer ring are detachably fixed together in an axial direction by a fastening element. In other words, fastening the inner member and the shaft portion of the joint outer ring may be made with fastening torque of a magnitude that is necessary and sufficient for preventing the joint outer ring loosening from the inner member. Therefore, besides a bolt or a nut, a fastening member such as a clip and a snap ring may also be used for the fastening.

The invention is also applicable for a bearing device using tapered rollers as rolling elements and suitable for automobiles that are inherently heavy.

In the structure having an inner member comprising a hub ring on an outer peripheral surface of which a wheel mounting flange, one of the raceways, and a small-diameter stepped portion are formed, and an inner ring, which is a separate member, fitted to the small-diameter stepped portion and on an outer peripheral surface of which the other raceway is formed, another pilot portion is formed between the end portion of the inner ring butted against the shoulder portion of the joint outer ring and the base part of the shaft portion of the joint outer ring. By forming the pilot portion between the end portion of the inner ring and the base part of the shaft portion of the joint outer ring, deformation of the raceway of the inner ring is prevented by loads acting in a direction of forming a contact angle, so that service life of the bearing device can be improved.

In this case, from among the two pilot portions formed between the base part of the shaft portion of the joint outer ring and the hub ring, and between the base part of the shaft portion of the joint outer ring and the end portion of the inner ring, clearance of the latter pilot portion is preferably made smaller than that of the former pilot portion.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3a and 3b are modified examples of the bearing device in FIG. 2, showing a cross sectional view of a bearing device for a driving wheel provided with two pilot portions;

DETAILED DESCRIPTION OF THE PREFERRED EMBODIMENTS

Figure 1A:
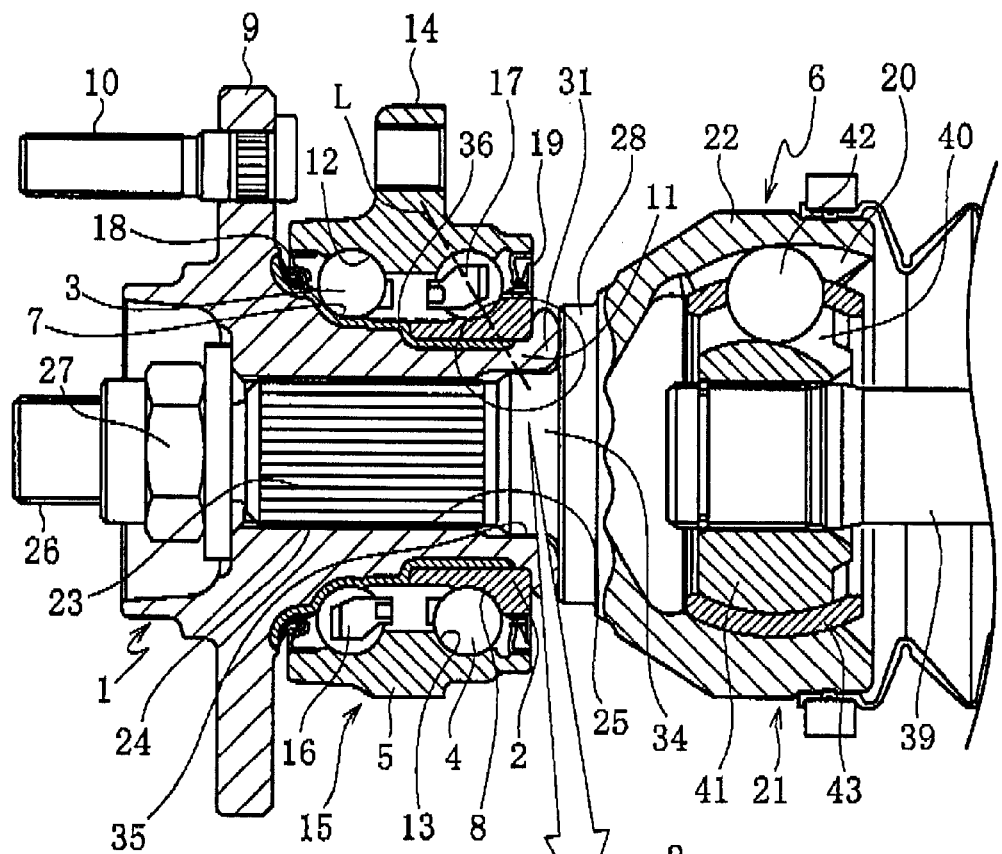
FIGS. 1a and 1b are cross sectional views of an embodiment of the invention, showing an example of a structure of a bearing device for a driving wheel using balls as rolling elements.
Figure 1B:
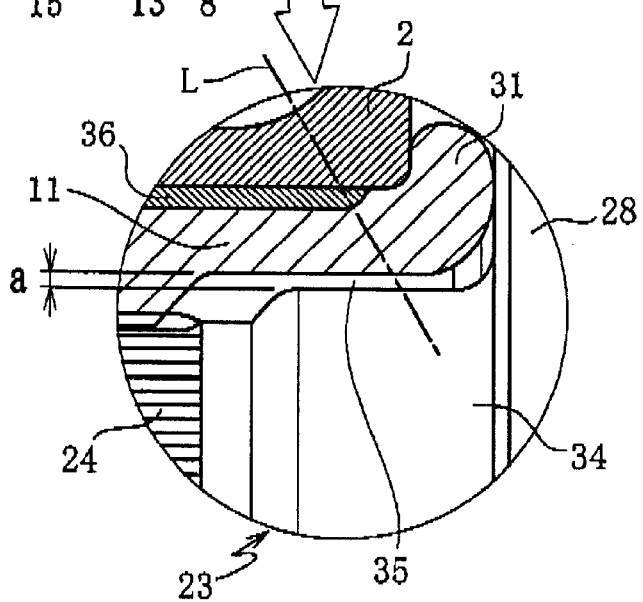

An embodiment shown in FIG. 1 shows a bearing device for a driving wheel in which a swaging process is applied in assembling the bearing device and balls are used as rolling elements. The bearing device comprises as main structural elements, for example, a hub ring 1 and an inner ring 2 as inner members, rolling elements 3 and 4 in double rows, an outer ring 5 as an outer member, and a constant velocity universal joint 6.

The hub ring 1 has an outboard raceway 7 and a wheel-mounting flange 9 for mounting a wheel on its outer peripheral surface. Hub bolts 10 for fixing a wheel disk are provided on the wheel-mounting flange 9 at equal intervals in a circumferential direction. The inner ring 2 is fitted onto a small-diameter stepped portion 11 formed on an outer peripheral surface of an inboard end portion of the hub ring 1, and an inboard raceway 8 is formed on an outer peripheral surface of the inner ring 2.

The inner ring 2 is pressed into position with an appropriate interference in order to prevent creeping. The outboard raceway 7 formed on the outer peripheral surface of the hub ring 1 and the inboard raceway 8 formed on the outer peripheral surface of the inner ring 2 constitute double raceways. A projection end portion of the small-diameter stepped portion 11 of the hub ring 1 is plastically deformed to be swaged outward, and the swaged portion, or a swaged portion 31, serves to prevent the inner ring 2 from loosening and to control preload of a bearing portion 15.

An outer ring 5 has double row raceways 12 and 13 opposing to the raceways 7 and 8 of the hub ring 1 and the inner ring 2 formed on an inner peripheral surface of the outer ring 5, and is provided with an automobile-body mounting flange 14 for mounting the bearing device on a automobile body. The automobile-body mounting flange 14 is fixed with bolts to a knuckle (not shown) extending from the suspension device of the automobile body.

The bearing portion 15 is of a double-row angular ball bearing structure in which the rolling elements 3 and 4 are provided between a group of the raceways 7 and 8 formed on the outer peripheral surfaces of the hub ring 1 and the inner ring 2 and a group of the raceways 12 and 13 formed on an inner peripheral surface of the outer ring 5, and the rolling elements 3 and 4 in each row of the raceways are supported by cages 16 and 17 at equal intervals in a circumferential direction.

At opening portions of both ends of the bearing portion 15, a pair of seals 18 and 19 for sealing an annular space formed by the outer ring 5, the hub ring 1, and the inner ring 2 are fitted into an inside of the hole at an end portion of the outer ring 5 in order to prevent leakage of grease filled inside and ingress of water or foreign matter from outside.

The constant velocity universal joint 6 comprises a joint outer ring 21 provided at one end of a shaft 39 and having a track groove 20 formed on its inner peripheral surface, a joint inner ring 41 on outer peripheral surface of which a track groove 40 opposing to the track groove 20 of the joint outer ring 21 is formed, balls 42 installed between the track groove 20 of the joint outer ring 21 and the track groove 40 of the joint inner ring 41, and a cage 43 provided between the joint outer ring 21 and the joint inner ring 41 for supporting the balls 42.

The joint outer ring 21 has a mouth portion 22 accommodating the joint inner ring 41, the balls 42, and the cage 43, and a shaft portion 23 extending in an axial direction from the mouth portion 22 and being formed with a serrated portion 24 on its outer peripheral surface. The shaft portion 23 is inserted through a through-hole of the hub ring 1, and the through-hole of the hub ring 1 and the shaft portion 23 are fitted together by serrated portions 24 and 25 formed respectively on an outside of the shaft portion 23 and an inner peripheral surface of the through-hole. Then, the constant velocity universal joint 6 is fixed to the hub ring 1 by fastening a nut 27 on an external thread portion 26 formed on an end of the shaft portion 23. The portions called serrated portions 24 and 25 also include spline besides serration.

In the bearing device according to the embodiment, a projection end portion of the small-diameter stepped portion 11 of the hub ring 1 is swaged to unitize the hub ring 1 and the inner ring 2 together to control preload of the bearing portion 15 by the swaged portion 31 of the hub ring 1. Therefore, the joint outer ring 21 may be fixed to the hub ring 1 with the nut 27 with tightening torque that is necessary and sufficient to prevent the shaft portion 23 of the joint outer ring 21 loosening from the hub ring 1. Besides a nut or a bolt, a fastening member (not shown) such as a clip and a snap ring may be used to detachably fix the shaft portion 23 of the joint outer ring 21 to the hub ring 1.

Because the embodiment of the bearing device for a driving wheel using balls as rolling elements 3 and 4 has a contact angle of about 35°, loads acting on the inner ring 2 in a direction of forming a contact angle are taken by the swaged portion 31 of the hub ring 1 butted against the shoulder portion 28 of the joint outer ring 21. Therefore, in this embodiment, a pilot portion 35 is provided between a base part 34 of the shaft portion of the joint outer ring 21 and the small-diameter stepped portion 11 of the hub ring 1. The pilot portion 35 is positioned on a line extending from the line L of forming a contact angle for the rolling elements 4 on the inboard raceway 8 of the inner ring 2, so that the axes of the hub ring 1 and the shaft portion 23 are aligned to secure their coaxiality.

The pilot portion 35 is formed by expanding an outside diameter of the base portion 34 of the shaft portion of the joint outer ring 21, and at the same time, expanding the inner diameter of the small-diameter stepped portion 11 of the hub ring 1 to a diameter larger than that of the serrated portion 25. The pilot portion 35 is thus formed and a clearance dimension 'a' at the pilot portion is set to 0.4 mm or less. Providing the clearance 'a' of the pilot portion makes it easier to insert the shaft portion 23 into the through-hole of the hub ring 1 when installing the constant velocity universal joint 6 in position. The clearance 'a' of the pilot portion means a half of the difference between the inner diameter of the small-diameter stepped portion 11 of the hub ring 1 and the outer diameter of the base part 34 of the shaft portion of the joint outer ring 21.

By providing the pilot portion 35 as described above, deformation of the small-diameter stepped portion 11 of the hub ring 1 is prevented by loads acting in a direction of forming a contact angle, and as a result, breakage of the hub ring 1 is prevented, and occurrence of fretting between the hub ring 1 and the inner ring 2 is reduced. Further, loads in a direction of forming a contact angle prevent deformation of the raceway 8 of the inner ring 2, improving rolling life and preventing rise in temperature. Also, loss in axial force (or preload) is prevented by decreased occurrence of fretting between the inner ring 2 and the shoulder portion 28 of the joint outer ring 21. Thus, service life of a bearing device is improved. When the clearance 'a' at the pilot portion is greater than 0.4 mm, desired effect of preventing deformation of the small-diameter stepped portion 11 of the hub ring 1 and that of the raceway 8 of the inner ring 2 can not be obtained.

Further, by making the swaged portion 31 of the hub ring 1 and the shoulder portion 28 of the joint outer ring 21 butt against each other in linear contact, noise from between the swaged portion 31 of the hub ring 1 and the shoulder portion 28 of the joint outer ring 21 is prevented from occurring. The serrated portions 24 and 25 formed on an outer peripheral surface of the shaft portion 23 of the joint outer ring 21 and on the inner peripheral surface of the hub ring 1 are fitted together with an interference given by, for example, a helix angle prepared on the serrated portion 24.

Further, a surface-hardened layer 36 is formed in an area (excluding an area of the swaged portion 31) extending from a base portion of the wheel mounting flange 9 to the small-diameter stepped portion 11 of the hub ring 1. The base part of the wheel mounting flange 9 is an outer peripheral surface, or a sealing surface portion, of the hub ring 1 with which a seal lip of a seal 18 installed at an outboard end portion of the outer ring 5 slidingly contact. The surface hardened layer 36 is formed in an area (excluding the area of the swaged portion 31) extending from the sealing surface portion via the raceway 7 to the small-diameter stepped portion 11.

From among each portion of the surface-hardened layer 36, the sealing surface portion is slidingly contacted with the seal lip of the seal 18, so that the sealing surface portion requires wear resistance. The raceway 7 requires durability because the rolling elements 3 roll thereon, and the small-diameter stepped portion 11 requires creep resistance and fretting resistance, because it fits into the inner ring 2. The swaged portion 31 does not require the surface-hardened layer 36 to be formed thereon, because the portion requires ductility.

Induction hardening is suited for a heat treatment to form the surface-hardened layer 36. By effectively using advantages of induction heating, an induction hardening process as a surface hardening process enables to freely select portions at which the surface-hardened layer 36 is formed, providing wear resistance and improving fatigue strength. Induction hardening is a method of producing heat by directly converting electrical energy to heat energy within metal using an electromagnetic induction phenomenon, and an induction heat treatment using this method has many features. Specifically, an induction heat treatment enables local heating, allows to freely select the depth of a hardened layer, and enables to control so as not to give remarkable thermal effect to portions other than the area to be hardened, so that characteristics of a base metal is maintained unaffected. Therefore, the swaged portion 31 may be left as a untreated base metal, with the desired surface-hardened layer 36 being allowed to be formed in an area extending from the sealing surface portion via the raceway 7 to the small-diameter stepped portion 11.

Rotation-life tests were carried out for a bearing device of the first embodiment in FIG. 1 for different clearance of the pilot portion, for example, and results that are described below were obtained. Results of the service life tests presenting operation hours of 255 hours and a temperature rise of 50° C. or less were obtained with a structure in which the clearance 'a' of the pilot portion of 0.4 mm is provided between the small-diameter stepped portion 11 of the hub ring 1 and the base part 34 of the shaft portion of the joint outer ring 21.

Contrary to this, in a structure without providing the pilot portion 35, only results of the service life tests presenting operation hours of 83 hours and a temperature rise of from 60 to 80° C. were obtained.

The test results described above show that the operation hours of the former structural example is three times or more as long as those of the latter structural example, and that temperature increase is also prevented. Therefore, it is obvious that it is easier to improve service life of a bearing device with the former structural example.

Figure 2A:
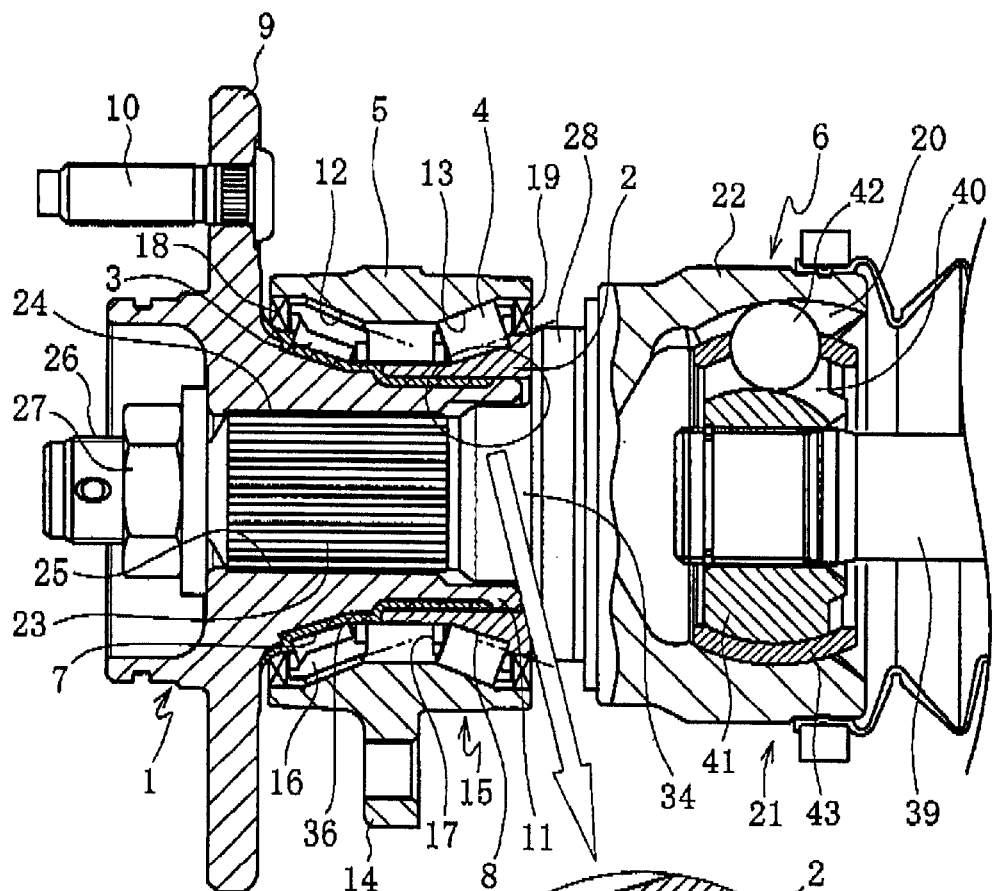
FIGS. 2a and 2b are cross sectional views of another embodiment of the invention, showing an example of a structure of a bearing device for a driving wheel using tapered rollers as rolling elements.
Figure 2B:
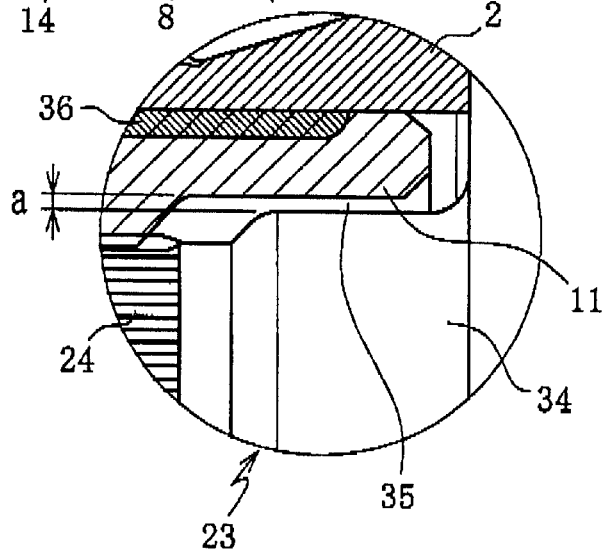
Figure 4:
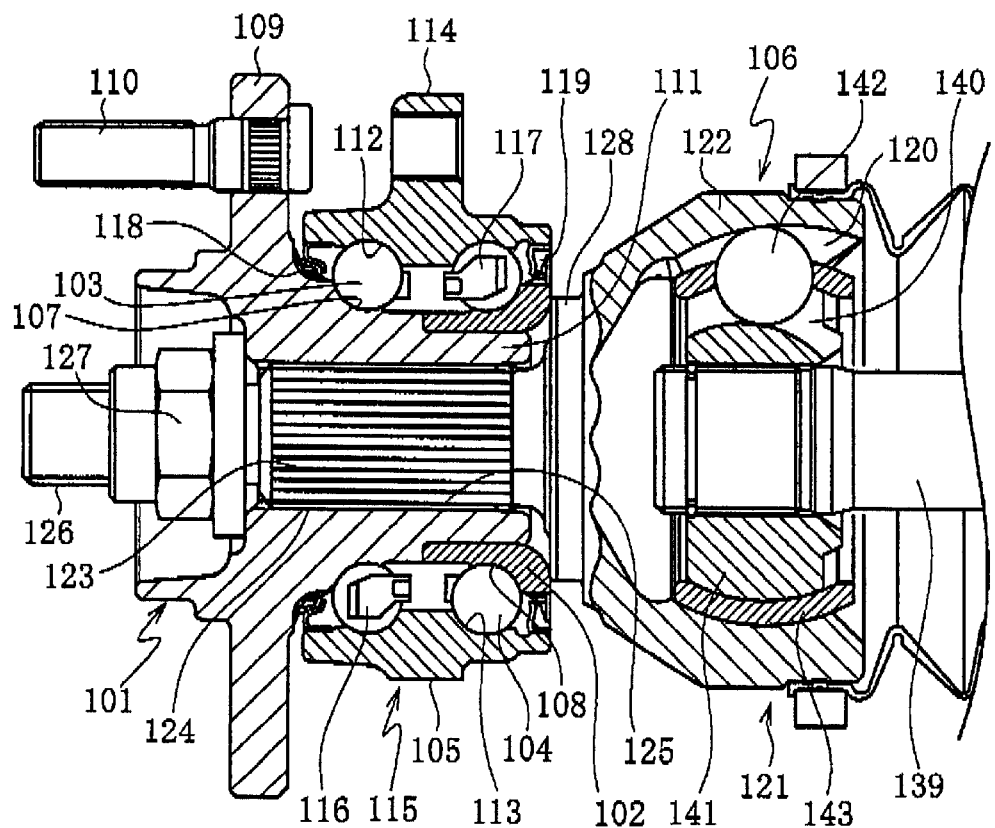
FIG. 4 shows an example of a conventional bearing device for a driving wheel, showing an example of a structure in which a joint outer ring is fixed to a hub ring with a nut.
Figure 5:
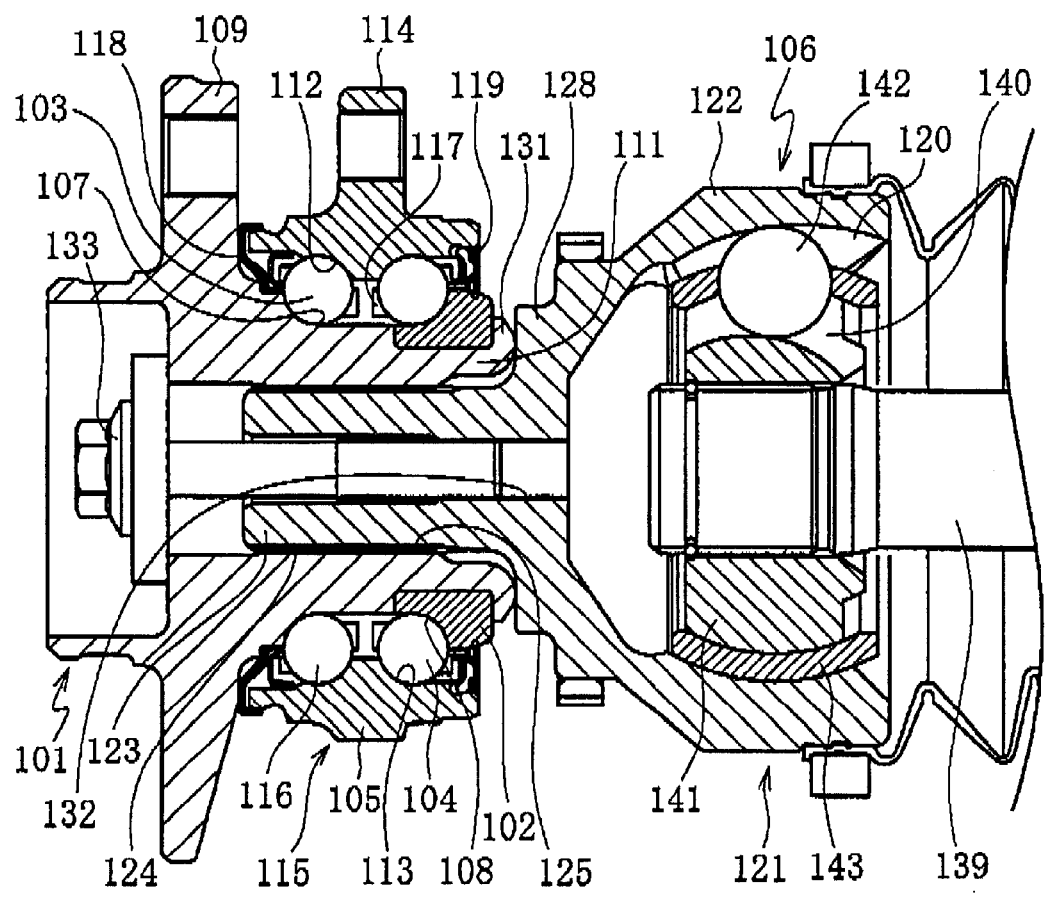
FIG. 5 shows another example of a conventional bearing device for a driving wheel, showing an example of a structure in which a hub ring and an inner ring are unitized by swaging.

An embodiment shown in FIG. 1 is a bearing device employing a swaging process in assembling the bearing device and using balls as the rolling elements 3 and 4. FIG. 2 shows a bearing device as another embodiment suited for, for example, automobiles that are inherently heavy. In this embodiment, tapered rollers are used as the rolling elements 3 and 4, and preload of the bearing portion 15 are controlled by tightening torque applied by the nut 27.

The bearing device (see FIG. 1) using balls as the rolling elements 3 and 4 has a contact angle of about 35°, so that loads acting on the inner ring 2 in a direction of forming a contact angle act toward a face on which the shoulder portion 28 of the joint outer ring 21 and the inner ring 2 butt against each other. Contrary to this, in the bearing device (see FIG. 2) using tapered rollers as the rolling elements 3 and 4, a contact angle is generally set to a smaller value of 16° to 20° to obtain a higher load capacity, so that loads in a direction of forming a contact angle act toward the small-diameter stepped portion 11 of the hub ring 1 and the base part 34 of the shaft portion of the joint outer ring 21. Therefore, in this embodiment, a pilot portion 35 is provided between the base part 34 of the shaft portion of the joint outer ring 21 and the small-diameter stepped portion 11 of the hub ring 1. The clearance 'a' of the pilot portion is set to 0.4 mm or less in the same manner as the embodiment in FIG. 1.

Further, FIG. 3 shows still another embodiment of the invention. In the bearing device of this embodiment, the pilot portion 35 described above is formed between the base part 34 of the shaft portion of the joint outer ring 21 and the small-diameter stepped portion 11 of the hub ring 1, and at the same time, a pilot portion 37 is also provided between an end portion of the inner ring 2 butted against the shoulder portion 28 of the joint outer ring 21 and the base part 34 of the shaft portion of the joint outer ring 21. The latter pilot portion, or the pilot portion 37, is formed by enlarging the diameter of the base part 34 of the shaft portion of the joint outer ring 21 so that the base part 34 is extended to the area of clearance between the end face of the small-diameter stepped portion 11 of the hub ring 1 and the shoulder portion 28 of the joint outer ring 21.

By forming the pilot portion 37, as described above, between the end portion of the inner ring 2 and the base part of the shaft portion of the joint outer ring 21, deformation of the raceway 8 of the inner ring 2 can be prevented by loads acting in a direction of forming a contact angle. Accordingly, rolling life and temperature rise are improved and rise in temperature and loss of axial force (or preload) are prevented because of reduced occurrence of fretting between the inner ring 2 and the shoulder portion 28 of the joint outer ring 21, so that service life of the bearing device is improved.

From among the two pilot portions 35 and 37 formed respectively between the base part 34 of the shaft portion of the joint outer ring 21 and the hub ring 1, and between the base part 34 of the shaft portion of the joint outer ring 21 and the end portion of the inner ring 2, clearance 'b' of the pilot portion formed between the base part 34 and the inner ring 2 is set smaller than the clearance 'a' of the pilot portion formed between the base part 34 and the hub ring 1.

That is, the clearance 'a' of the pilot portion formed between the small-diameter stepped portion 11 of the hub ring 1 and the base part 34 of the shaft portion of the joint outer ring 21 is set to 0.4 mm or less as described above, while the clearance 'b' of the pilot portion formed between the base part 34 of the shaft portion of the joint outer ring 21 and the end portion of the inner ring 2 is set to 0.05 mm or less. If the clearance 'b' is greater than 0.05 mm, the desired effect of preventing deformation of the raceway 8 of the inner ring 2 can not be obtained. From among the two pilot portions of 35 and 37, one of the pilot portions, or the pilot portion 37, prevents the inner ring 2 from deforming, and when higher loads are applied, the other pilot portion, or the pilot portion 35, prevents the hub ring 1 from deforming.

Further, in the same manner as the embodiment in FIG. 1, it is so constituted that a surface-hardened layer 36 is formed in an area extending from the base portion of the wheel mounting flange 9 to the small-diameter stepped portion 11 of the hub ring 1, and the surface-hardened layer 36 ends in the vicinity of an end face of the small-diameter stepped portion 11 of the hub ring 1.

Rotation-life tests were carried out for the bearing device of the embodiment shown in FIG. 2, for different clearance dimensions of the pilot portions, for example, and results described below were obtained. Results of service life tests presenting operation hours of 165 hours and a temperature rise of 50° C. or less were obtained in a structure in which the clearance 'a' of the pilot portion of 0.4 mm was formed between the small-diameter stepped portion 11 of the hub ring 1 and the base part 34 of the shaft portion of the joint outer ring 21, and also the clearance 'b' of the pilot portion of 0.05 mm was formed between the end portion of the inner ring 2 and the base part 34 of the shaft portion of the joint outer ring 21.

Contrary to this, only results of service life tests presenting operation hours of 52 hours and a temperature rise in a range from 72° C. to 90° C. were obtained in a structure in which clearance of the pilot portion of 2 mm was formed between the small-diameter stepped portion 11 of the hub ring 1 and the base part 34 of the shaft portion of the joint outer ring 21, and at the same time, clearance of the pilot portion of 8.75 mm was formed between the end portion of the inner ring 2 and the base part 34 of the shaft portion of the joint outer ring 21.

The test results described above show that the operation hours of the former structural example is three times or more as long as those of the latter structural example, and also a rise in temperature is prevented in the same example. Therefore, it is obvious that the former structural example facilitates improvement of a bearing device.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A bearing device for a driving wheel comprising:

an outer member on an inner peripheral surface of which raceways in double rows are formed;

an inner member on an outer peripheral surface of which raceways opposing to the raceways of the outer member and a wheel mounting flange are formed;

rolling elements of double rows provided between each of the raceways of the outer member and the inner member; and a constant velocity universal joint having a joint outer ring of which a shaft portion is inserted into the inner member in such a manner that torque is transmittable, the bearing device rotatably supporting a wheel on an automobile body, wherein a pilot portion of the bearing device provides a clearance between a base part of the shaft portion of the joint outer ring and an end portion of the inner member wherein the clearance of the pilot portion is 0.4 mm or less.

2. The bearing device according to claim 1, wherein the outer member integrally has the raceways of double rows and an automobile-body mounting flange on its inner and outer peripheral surfaces, respectively.

3. The bearing device according to claim 1, wherein the inner member comprises a hub ring on an outer peripheral surface of which the wheel mounting flange, one of the raceways, and a small-diameter stepped portion are formed and an inner ring, which is a separate member, fitted onto the small-diameter stepped portion and formed with the other raceway on its outer peripheral surface.

4. The bearing device according to claim 3, wherein a surface hardened layer is formed in an area extending from a base portion of the wheel-mounting flange to the small diameter stepped portion.

5. The bearing device according to claim 1, wherein the pilot portion is positioned on a line extending from the line of forming a contact angle for the rolling elements on the raceways of the inner member.

6. The bearing device according to claim 1, wherein serrated portions, formed on the inner member and the shaft portion of the joint outer ring in such a manner that torque is transmittable, are fitted together with an interference.

7. The bearing device according to claim 1, wherein the inner member has a swaged portion in which an end portion of the inner member is plastically deformed toward its outside-diameter side, and the swaged portion is butted against a shoulder portion of the joint outer ring in a linear contact.

8. The bearing device according to claim 7, wherein the inner member and the shaft portion of the joint outer ring are detachably fixed together in an axial direction by a fastening element.

9. The bearing device according to claim 1, wherein the rolling elements are tapered rollers.

10. The bearing device according to claim 9, wherein the inner member comprises a hub ring on an outer peripheral surface of which the wheel mounting flange, one of the raceways, and a small-diameter stepped portion are formed, and an inner ring, which is a separate member, fitted onto a small diameter stepped portion and formed with the other raceway on its outer peripheral surface, and another pilot portion is formed between the end portion of the inner ring butted against a shoulder portion of the joint outer ring and the base part of the shaft portion of the joint outer ring.

* * * * *